US008331244B1

(12) United States Patent
Jones et al.

(10) Patent No.: US 8,331,244 B1
(45) Date of Patent: Dec. 11, 2012

(54) SYSTEM AND METHOD FOR PROPAGATING TDM FAULT INFORMATION THROUGH A PACKET NETWORK

(75) Inventors: David Eric Jones, Huntsville, AL (US); Marc Kimpe, Huntsville, AL (US); Harold Lloyd Boling, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 281 days.

(21) Appl. No.: 12/636,223

(22) Filed: Dec. 11, 2009

Related U.S. Application Data

(60) Provisional application No. 61/236,063, filed on Aug. 21, 2009.

(51) Int. Cl.
*G01R 31/08* (2006.01)
(52) U.S. Cl. ............ 370/241.1; 370/244; 370/250; 370/442; 370/467; 709/244; 709/246; 709/253
(58) Field of Classification Search .................. None
See application file for complete search history.

(56) References Cited

U.S. PATENT DOCUMENTS

| | | | | |
|---|---|---|---|---|
| 5,640,512 | A * | 6/1997 | Czerwiec | 370/241 |
| 6,990,121 | B1 * | 1/2006 | Stiles et al. | 370/466 |
| 7,002,968 | B1 * | 2/2006 | Tomizawa et al. | 370/442 |
| 7,477,638 | B1 * | 1/2009 | Kumar et al. | 370/466 |
| 2003/0147372 | A1 * | 8/2003 | Pattavina et al. | 370/442 |
| 2004/0008718 | A1 * | 1/2004 | English et al. | 370/442 |
| 2004/0202199 | A1 * | 10/2004 | Fischer et al. | 370/474 |
| 2004/0252717 | A1 * | 12/2004 | Solomon et al. | 370/466 |
| 2006/0182134 | A1 * | 8/2006 | Pascasio et al. | 370/466 |
| 2008/0172497 | A1 | 7/2008 | Mohan et al. | |
| 2009/0109861 | A1 | 4/2009 | Kini et al. | |
| 2009/0113070 | A1 | 4/2009 | Mehta et al. | |
| 2009/0154364 | A1 * | 6/2009 | Felkar et al. | 370/245 |
| 2010/0238791 | A1 * | 9/2010 | Duncan et al. | 370/216 |

OTHER PUBLICATIONS

RAD Data Communications The Access Company, ACE-3000 Family, ACE-3100 Cell-Site Gateway, Data Sheet, pp. 1-8, 2007.
RAD's Access Solutions for the Wireless Market, "http://www.rad-wireless.com/Article/2,6583,36596-TDM_Pseudowire_Access_Gateway,0...," Aug. 19, 2009.
RAD Data Communications-North America, "http://radusa.com/0,6583,40214-SFP_Format_TDM_Pseudowire_Gateway,0...," Aug. 19, 2009.

* cited by examiner

*Primary Examiner* — Jeffrey M Rutkowski
(74) *Attorney, Agent, or Firm* — Maynard, Cooper & Gale, P.C.; Jon E. Holland

(57) ABSTRACT

A communication system for propagating time division multiplexing (TDM) fault notifications has a first interworking function (IWF) of a packet network and a second IWF of the packet network. The second IWF detects a TDM fault of a TDM network and transmits continuity check messages (CCMs) to the first IWF. Further, the second IWF controls the CCMs in response to a detection of the TDM fault such that a TDM fault notification is propagated from the second IWF to the first IWF based on the CCMs, and the first IWF propagates the TDM fault notification to a second TDM node via a TDM signal.

19 Claims, 5 Drawing Sheets

SYSTEM AND METHOD FOR PROPAGATING TDM FAULT INFORMATION THROUGH A PACKET NETWORK

CROSS REFERENCE TO RELATED APPLICATIONS

This application claims priority to U.S. Provisional Patent Application Ser. No. 61/236,063, entitled "TDM Fault Propagation Through a Packet Networked," and filed on Aug. 21, 2009, which is incorporated herein by reference.

BACKGROUND

Telecommunication service providers are rapidly turning toward Ethernet for a cheaper and more suitable means to backhaul packetized data. When granting end customers' access to their network, these service providers can find it cost effective to utilize the embedded transport infrastructure with its traditional layer 2 protocols. Time Division Multiplexing (TDM), such as T1 and T3, has this infrastructure, while traditional layer 2 protocols like Point-to-Point Protocol (PPP), Multi-Link Point-to-Point Protocol (MLPPP), and Frame Relay are used to encapsulate customers' data.

The customers' data is interworked between the embedded TDM transport with its traditional layer 2 protocols and the Ethernet backhaul. Ethernet is inclusive of both its physical layer 1 transport and its logical layer 2. The layer 2 encapsulates and guides customer data within the Ethernet backhaul. There are considerations for the interworking function other than translating customer data between Ethernet and TDM networks. It is desirable for fault conditions in layers 1 and 2 to be communicated across the interworking function, but currently there is no standard to communicating such fault conditions across the interworking function. A heretofore unaddressed need exists in the art for propagating fault conditions through a packet network without violating applicable protocols, such as Ethernet protocols.

SUMMARY

A communication system for propagating time division multiplexing (TDM) fault notifications in accordance with an embodiment of the present disclosure has a first interworking function (IWF) of a packet network and a second IWF of the packet network. The second IWF detects a TDM fault of a TDM network and transmits continuity check messages (CCMs) to the first IWF. Further, the second IWF controls the CCMs in response to a detection of the TDM fault such that a TDM fault notification is propagated from the second IWF to the first IWF based on the CCMs, and the first IWF propagates the TDM fault notification to a second TDM node via a TDM signal.

A communication method for propagating time division multiplexing (TDM) fault notifications through a packet network embedded within a TDM network in accordance with an embodiment of the present disclosure comprises receiving TDM frames from a first TDM node and detecting a TDM fault at a first interworking function (IWF) node based on the TDM frames, the first IWF located on an edge of the packet network. The method further comprises controlling transmission of continuity check messages (CCMs) to a second IWF node based upon the detecting, the second IWF located at an edge of the packet network and propagating a TDM fault notification from the second IWF node to a second TDM node based on at least one of the CCMs.

DESCRIPTION

A system in accordance with an embodiment of the present disclosure comprises a time division multiplexing (TDM) node that transmits TDM frames to a remote TDM node. During such transmission, the information is propagated through a packet network segment, e.g., an Ethernet segment, having internetworking function (IWF) nodes at its edges. An IWF node receives the TDM frames and translates the TDM frames to Ethernet packets for communication through the packet network. Another IWF node receives the Ethernet packets and translates the Ethernet packets back to TDM frames for propagation to a TDM node.

During operation, there may be an error on an incoming communication connection resulting in a TDM fault indication, such as a loss of frame (LOF), loss of signal (LOS), or alarm indication signal (AIS). In addition, layer 2 transport protocols may produce errors, for example, if the link control protocol (LCP) is down, the network control protocol (NCP) is down, or the local management interface (LMI) is down. If one of the errors is detected by the IWF node on an outgoing communication connection, the IWF node at the edge of the packet networks uses a continuity check message (CCM) packet in order to propagate the TDM or its layer 2 fault indication through the packet network. For example, the IWF node may set a particular bit in the CCM in order to indicate the TDM fault and then transmit the CCM through the packet to another IWF node at an edge of the packet networks. In response, this other IWF node transmits a TDM fault notification to a TDM node.

Figure 1:
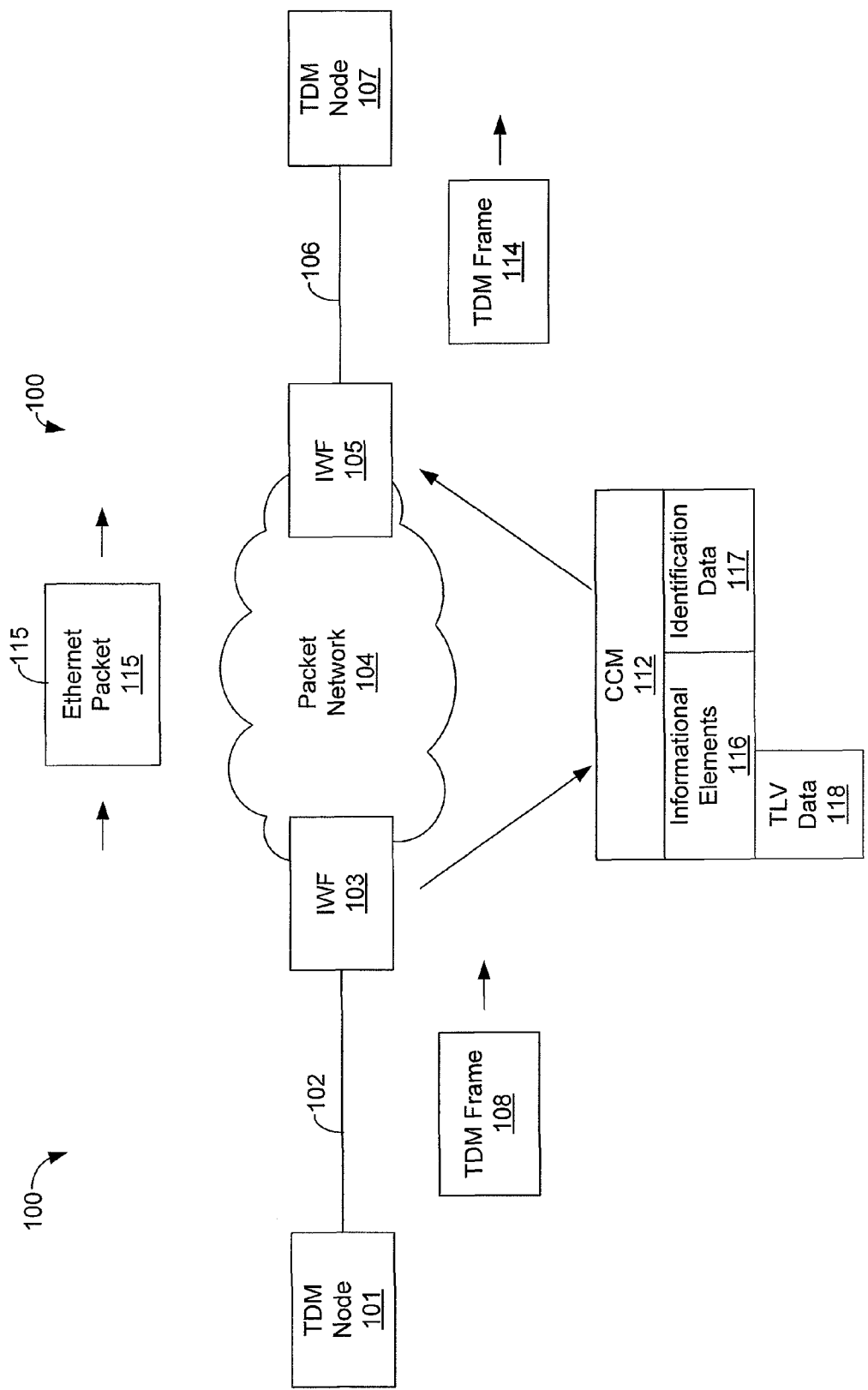
FIG. 1 is a block diagram depicting a system for propagating fault information in accordance with an embodiment of the present disclosure.

FIG. 1 depicts an exemplary embodiment of a communication system 100. The system 100 has time division multiplexing (TDM) nodes 101, 107 that communicate with one another through a packet network 104, such as the Ethernet. In this regard, the TDM node 101 is coupled to an interworking function (IWF) 103 of the network 104 via a communication connection 102, such as one or more twisted pairs, and the TDM node 107 is coupled to an IWF 105 via a communication connection 106, such as one or more twisted pairs. Data packets may be communicated by the IWFs 103, 105 through the network 104. The IWFs 103, 105 provide an interface between a TDM network comprising the nodes 101, 107 and connections 102, 106 and the packet network 104, which is embedded within the TDM network. For illustrative purposes, it will be assumed hereafter that the network 104 is the Ethernet and that the packets communicated by the IWFs 103, 105 are in accordance with applicable Ethernet protocols, such as I.E.E.E. 802.1ag-2007, although other types of packet networks and other types of protocols are possible in other embodiments.

The IWFs 103, 105 are configured to receive TDM frames and to translate the payload of the layer 2 protocols (e.g., PPP, MLPPP) transported by the TDM frames into at least one Ethernet packet for communication through the network 104. For example, assume that the TDM node 101 transmits a TDM frame 108 carrying payload data to be received by the TDM node 107. The TDM frame 108 is received by the IWF 103, which de-encapsulates the TDM frame 108 to obtain the payload data of the layer 2 protocol transmitted by the TDM node 101 and re-encapsulates the payload data of the layer 2 protocol transported by the TDM frame 108 into one or more Ethernet packets 115 destined for the IWF 105. The IWF 103 transmits such packets through the packet network 104 to the IWF 105, which de-encapsulates the Ethernet packet 115 to obtain the payload data and re-encapsulates such payload data into a layer 2 protocol to form the payload of at least one TDM frame 114 for transmission to the TDM node 107.

Various types of protocols may be used to communicate the data that is to be received by the TDM node 107. Exemplary protocols will be described in more detail below, but it should be emphasized that other protocols may be used in other embodiments. In one exemplary embodiment, the TDM frame 108 transmitted by the TDM node 101 is a T1 signal, but other types of frames, such as T3 frames, may be used. In addition, the TDM frame 108 comprises Internet Protocol (IP) packets, which are the payload of the layer 2 protocol of the TDM frame 108 and are transmitted to the IWF 105. In other embodiments, the payload data encapsulated in the layer 2 protocol of the TDM frame 108 may be in a format other than IP, if desired. In one exemplary embodiment, the layer 2 protocol is Point-to-Point Protocol (PPP), but other types of layer 2 protocols, such as MLPPP or frame relay, may be used to encapsulate payload data in other embodiments. Thus, the TDM frame 108 comprises, in addition to the IP packet, header and framing information in accordance with IP over PPP over T1. Note that the TDM frame may be other frames other than TDM in other embodiments.

The IWF 103 is configured to recover the IP packet encapsulated by the layer 2 protocol of the TDM frame 108 and to interwork the IP packet into the Ethernet packet 115 for communication through the network 104. In this regard, the IWF 103 strips away the PPP and T1 layers to recover the IP packet and then encapsulates the IP packet into an Ethernet packet 115, which is transmitted through the network 104 to the IWF 105. The IWF 105 strips away the Ethernet layers to recover the IP packet and then encapsulates the IP packet according to a layer 2 protocol that is transmitted in a TDM frame 114 to the TDM node 107.

If desired, the IWF 105 may layer the IP packet via the same protocols used by the TDM node 101. For example, if the TDM frame 108 transmitted by the TDM node 101 is IP over PPP over T1, as described above, then the IWF 105 may layer the IP packet to be received by the TDM node 107 via PPP and T1, as well. Thus, the TDM node 107 receives data in the same format as if the packet network 104 was absent from the system 100. In such case, the presence of the network 104 may be transparent to the TDM nodes 101, 107.

I.E.E.E. 802.1ag-2007 defines Ethernet Operations and Maintenance (OAM) standards that are used to convey operation and maintenance information about the network 104. Using Ethernet OAM, the IWFs 103, 105 can detect network events and issues that affect the flow of data through the packet network 104.

As an example, Ethernet OAM uses a Continuity Check Message (CCM) 112 to communicate the health of a flow between nodes (e.g., IWF 103 and the IWF 105). A CCM generally refers to a control message that is used to confirm connectivity between two nodes of a network. A CCM may include various control information about or pertaining to the message's source node. Applicable Ethernet standards define the format of a CCM in an Ethernet network, but protocol other than Ethernet may be used in various embodiments of the disclosure.

In the ordinary course, the IWF 103 and IWF 105 periodically transmit CCMs 112 to each other. If one of the IWFs 103, 105 stops receiving CCMs from the other IWF 103, 105 for at least a specified time period, then the IWF 103, 105 is made aware that there is some fault in the Packet Network 104 has blocked incoming CCMs or that IWF 103, 105 has ceased transmitting CCMs in response to some fault in connection 102, 106 or in TDM Node 101, 107.

In addition, the CCM 112 may have various fields indicative of the health and status of the IWF that is transmitting the CCM 112. In this regard, the CCM 112 comprises informational elements 116 and identification data 117. The informational elements 116 also comprise Type Length Value (TLV) data 118.

The TLV data 118 may have a number of bits that can be indicative of the state of the IWF 103, 105 that transmitted the CCM. In this regard, the TLV data 118 may have a bit (not shown) or set of bits (not shown) that when selected indicates the health of peer IWF 103, 105. Such bits may be assorted to indicate isUp, isDown, isUnknown, isTesting, isDormant, isNotPresent, and isLowerLayerDown. Such indicators are defined by the Ethernet OAM.

The isUP indicator indicates that the node is able to send and receive packets, and the isDown indicator indicates that the IWF 103, 105 is in error or other fault condition. The isUnknown indicator indicates that the state of the node cannot be ascertained, and the isTesting indicator indicates that some test is to be performed on the node. Further, the isDormant indicator indicates that the node is operable but is waiting for other external events to occur before it can transmit or receive packets, and the isNotPresent indicator indicates that node components are missing. The isLowerLayerDown indicator indicates that the node is prevented from entering the up state because of the state of one or more on the interfaces beneath it in the interface stack.

The Packet Network may contain its own nodes that process the presence and absence of CCM 112, but not the TLV data 118 within CCM 112. To accommodate such nodes, IWFs 103, 105 may be configured to not support the TLV data 118, such as isUp or isDown, in the CCMs 112. For such IWFs 103, 105, the presence of a CCM message indicates the isUp status, and the absence of a CCM for a specified time period indicates the isDown status.

If a communication fault disrupts the communication between the TDM nodes 101, 107, it is often desirable for the nodes 101, 107 to be informed of the fault so that the nodes 101, 107 can take actions to mitigate the effects of the fault. For example, in the event of a fault, it may be desirable for the TDM nodes 101, 107 to stop communication via the data path along connections 102, 106 and/or to begin communication via a backup data path.

There are a number of fault conditions that may be detected by IWF 103, 105 related to incoming connection 102, 106, respectively. One type of fault condition is an alarm indication signal (AIS). In this regard, TDM nodes generally can inform and be informed of a communication fault via the transmission of an Alarm Indication Signal (AIS). That is, when one TDM node detects a communication fault, such TDM node can transmit the AIS in the direction that a good communication would have continued, so as to indicate the detection of the fault to a destination TDM node. As known in the art, the AIS is a TDM signal that comprises all logical ones (1s). Other types of errors that may be detected by IWF 103, 105 related to incoming connection 102, 106, respectively are a loss of frame (LOF) or a loss of signal (LOS). For example, LOF occurs when one or more TDM frames 108 being transmitted from the TDM node 101 cannot be extracted from the incoming information by IWF 103. LOS occurs when no incoming information is available from which IWF 103 can attempt to extract TDM frames 108. In addition, there may be a fault if layer 2 protocols such as the LCP is down, the NCP is down, or the LMI is down.

It would be beneficial if such error notifications indicating AIS, LOF, LOS, or other types of TDM error conditions, including errors in layer 2 protocols such as LCP, NCP or LMI, could be transmitted through the packet network 104 and to the TDM node 107. However, the presence of the packet network 104 in the system 100 makes end-to-end propagation of the AIS, LOF, LOS or any other fault indication problematic in at least some situations.

In one exemplary embodiment, the IWFs 103, 105 are configured to use the CCMs of the Ethernet network 104 to convey TDM fault information so that a TDM fault indication may propagate through the packet network 104 to either of the TDM nodes 101, 107. In this regard, if one of the errors occurs, such error is indicated in the TLV data 118, for example by asserting one or more bits that indicate isDown.

For example, assume that that the IWF 103 receives a fault indication, such as an LOF, due to a communication problem associated with the communication connection 102 or TDM node 101. It is generally desirable for the fault indication to propagate through the network 104 to the TDM node 107. In one exemplary embodiment, to convey the fault indication to the IWF 107, the IWF 103 is configured to immediately transmit a CCM and to include an isDown indication in the TLV data 118 in response to the fault indication. Upon receiving the CCM, the IWF 105 is configured to interpret the isDown indication in the TLV data 118 as a TDM fault and transmit a TDM signal, such as an AIS, indicating the fault to the TDM node 107. Thus, the node 107 can be informed of a TDM fault that occurs on an opposite side of the network 104, such as a fault associated with the connection 102 or the TDM node 101.

Thus, the IWF 103 interworks a TDM fault indication into a CCM 112, which is transmitted to the IWF 105. The IWF 105 transmits an AIS signal to the TDM node 107. Accordingly, a fault indication is propagated from one side of the network 104 to the other in a manner that is transparent to the TDM nodes 101, 107. In conveying the fault indication, the packet network 104 mimics the behavior of the TDM network.

In other embodiments, other techniques can be employed to use a CCM 112 to propagate a TDM fault indication. For example, instead of using the TLV data 118 of a CCM 112 to convey TDM fault information, the IWF 103 can be configured to temporarily stop transmitting CCMs 112 for at least a specified time period in response to a TDM fault indication. If the IWF 105 does not receive a CCM 112 from the IWF 103 for at least the specified time period, then the IWF 105 is configured to transmit a TDM fault indication, such as an AIS, to the TDM node 107. In other examples, other indicators of the CCM, such as other indicators in the TLV data 118, can be used to convey fault indications.

In addition to propagating a TDM fault notification from one side of the packet network 104 to the other, CCMs 112 may be similarly used to convey fault notifications for faults within or associated with the packet network 104. Indeed, fault conditions inside the Ethernet 104 can also result in no CCMs 112 or CCMs 112 with TLV data 118 set to isDown. Therefore, the end TDM node 107 can be notified of faults on both the TDM portion and the Ethernet portion of the entire network. Further, techniques similar to those described herein for notifying the TDM node 107 of faults may be used to notify the TDM node 101 of faults. The system 100 allows end-to-end fault notification in either direction.

Some exemplary fault notifications will now be described in more detail below. In one exemplary embodiment, if the IWF 103 is running tests, such as a bit error rate test (BERT) and loopback tests, on the TDM node 101, then the IWF 103 includes an isTesting indicator in the TLV data 118. Thus, if the IWF 105 receives a CCM 112 including an isTesting indicator in the TLV data 118, the IWF 105 is configured to transmit a fault indication, such as an AIS, to the TDM node 107.

In another embodiment, if the physical layer TDM is good, but no TDM frame 108 has been provisioned to traverse the TDM link between the IWF 103 and the TDM node 101, the IWF 103 includes an isDormant indication in the TLV data 118. If the IWF 105 receives a CCM 112 including an isDormant indication in the TLV data 118, the IWF 105 is configured to transmit a TDM fault indication, such as an AIS, to the TDM node 107.

In another embodiment, if a TDM node 101 is not connected to the IWF 103, then the IWF 103 includes an isNotPresent indication in the TLV data 118, and if the IWF 105 receives a CCM 112 including an isNotPresent indication in the TLV data 118, then the IWF 105 is configured to transmit a TDM fault indication, such as an MS, to the TDM node 107.

In yet another embodiment, if the layer 2 for the TDM node 101 is down, then the IWF 103 includes an isLowerLayerDown indication in the TLV data 118. If the IWF 105 receives a CCM 112 including an isLowerLayerDown indication in the TLV data 118, then the IWF 105 is configured to transmit a TDM fault indication, such as an AIS, to the TDM node 107. Various other techniques may be used to convey TDM fault information through the network 104.

In addition, as described above, the IWF 105 may be configured to transmit an AIS to the TDM node 107 to indicate a detected fault. However, other techniques to indicate a detected fault may be employed in other embodiments. For example, the IWF 105 may be configured to stop transmitting to the TDM node 107 for at least a specified time period in response to a TDM fault indication. In yet other embodiments, signals other than an AIS may be used as a TDM fault indication.

Figure 2:
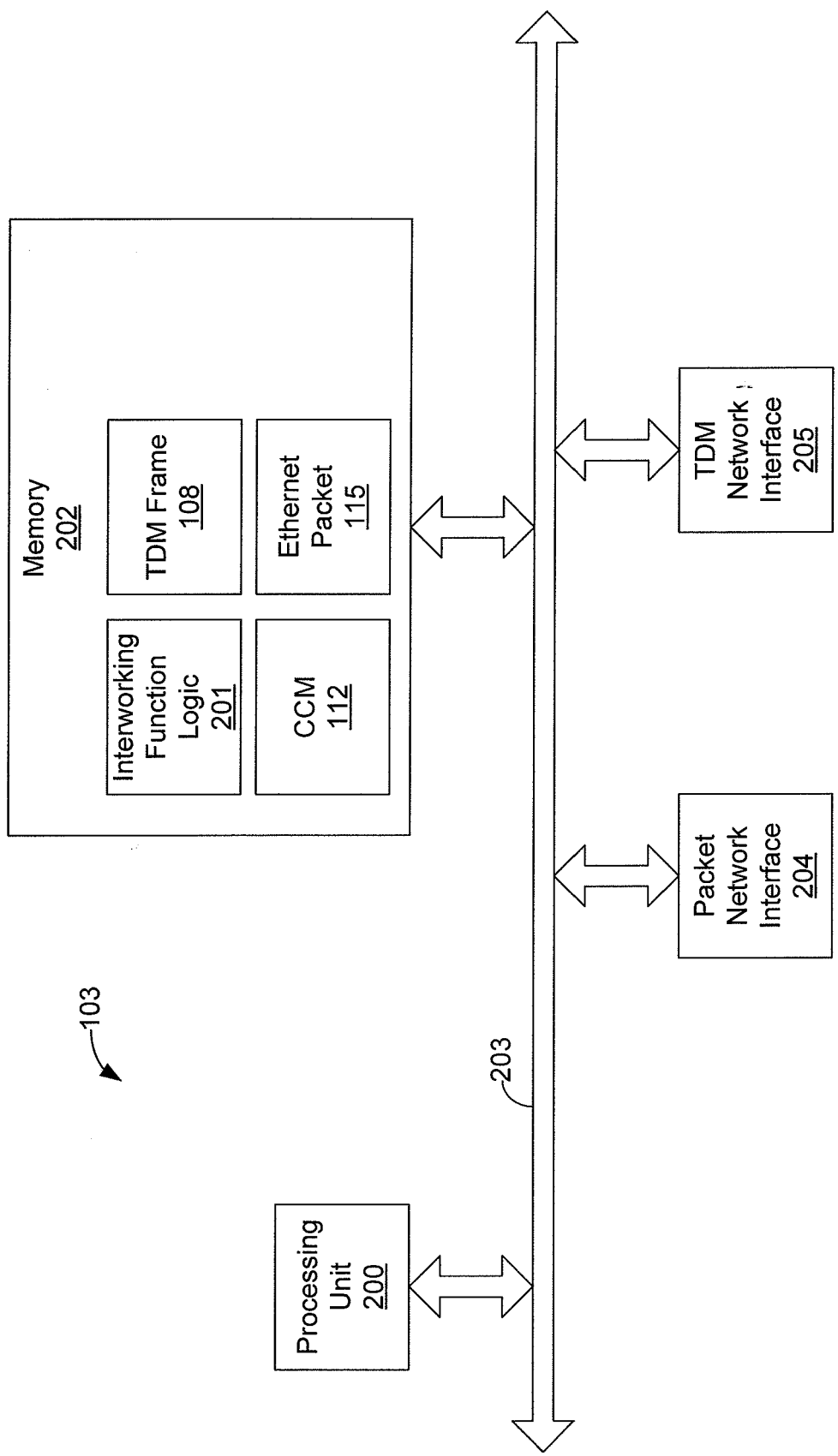
FIG. 2 is a block diagram of a first interworking function (IWF) of the system depicted in FIG. 1.

FIG. 2 is a block diagram depicting an exemplary IWF 103 in accordance with an embodiment of the present disclosure. The IWF 103 comprises a processing unit 200, a packet network interface 204, a TDM network interface 205, and memory 202. Each of these components communicates over a local interface 203, which can include one or more buses.

In addition, the IWF 103 comprises IWF logic 201. The IWF logic 201 can be implemented in software, hardware, firmware or any combination thereof. In the exemplary IWF 103 shown in FIG. 2, IWF logic 201 is implemented in software and stored in memory 202. Memory 202 may be of any type of memory known in the art, including, but not limited to random access memory (RAM), read-only memory (ROM), flash memory, and the like.

Processing unit 200 may be a digital processor or other type of circuitry configured to run the IWF logic 201 by processing and executing the instructions of the IWF logic 201. The processing unit 200 communicates to and drives the other elements within the IWF 103 via the local interface 203, which can include one or more buses.

In addition, the packet network interface 204 may be any type of communication device (e.g., Ethernet physical layer device (PHY)) that communicatively couples the IWF 103 with the packet network 104 (FIG. 1) and the TDM network interface 205 may be any type of communication device that communicatively couples the IWF 103 with connection 102 to the TDM node 101.

During operation, the IWF logic 201 receives, via the TDM network interface 205, a TDM frame 108, which the IWF logic 201 stores in memory 202. The IWF logic 201 de-encapsulates the TDM frame 108 to recover an IP packet from the layer 2 protocol encapsulated within the TDM frame 108. The IWF logic 201 then encapsulates the IP packet within an Ethernet packet 115. The IWF logic 201 then transmits the Ethernet packet 115 to the IWF 105 (FIG. 1).

During operation, the IWF logic 201 may detect a fault, for example, the IWF logic 201 may detect AIS, LOS, or LOF, as described herein. If such a fault is detected by the IWF logic 201, the IWF logic 201 generates a CCM 112 that comprises TLV data 119 (FIG. 1) in which an isDown indicator is asserted. The IWF logic 201 then transmits the CCM 112 to the IWF 105, which interprets the TLV data 118 and the isDown indicator as being a TDM fault, and in turn transmits an AIS to the TDM node 107 (FIG. 1).

Figure 3:
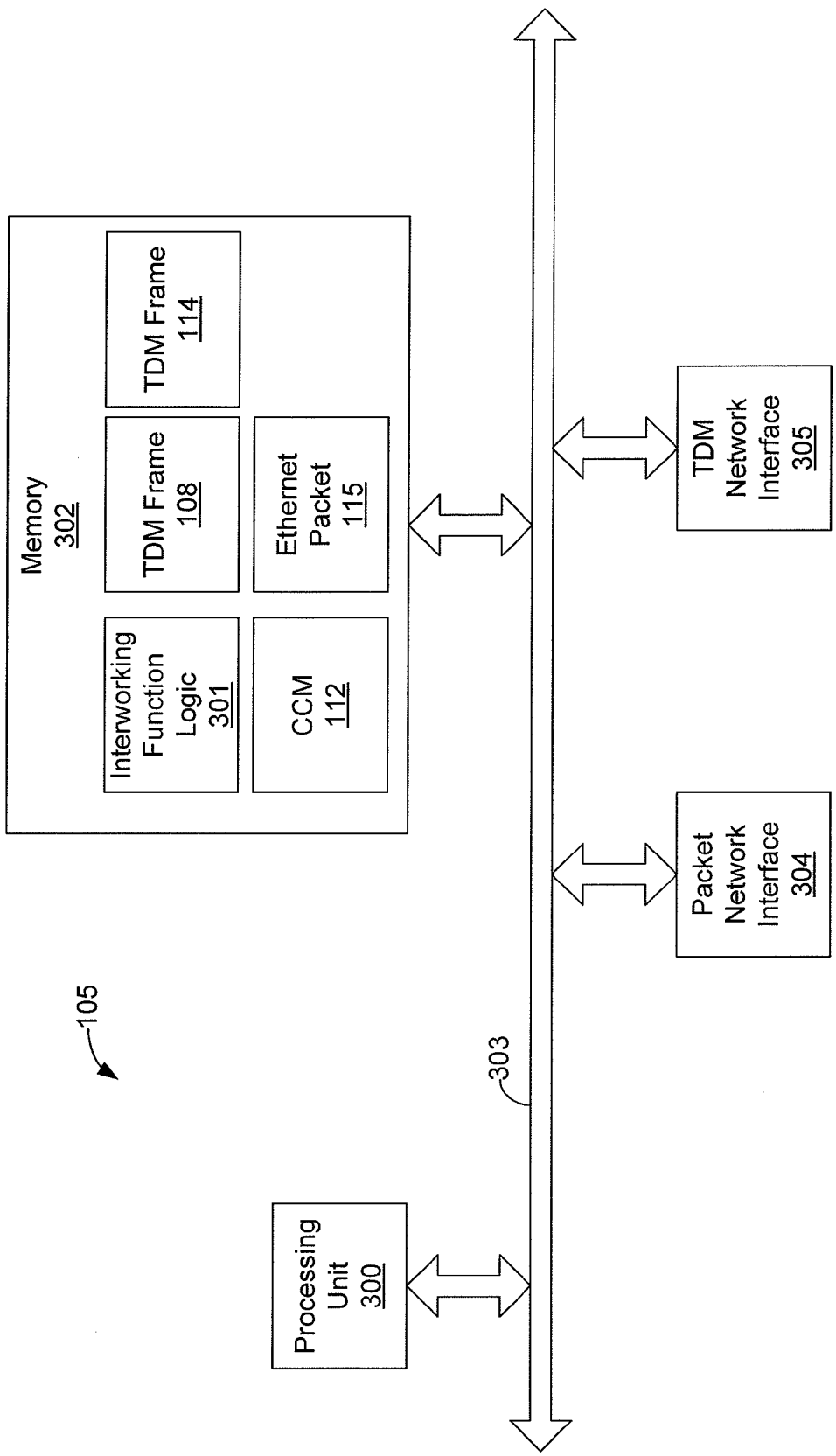
FIG. 3 is a block diagram of a second interworking function (IWF) of the system depicted in FIG. 1.

FIG. 3 is a block diagram depicting an exemplary IWF 105 in accordance with an embodiment of the present disclosure. The IWF 105 comprises a processing unit 300, a packet network interface 304, a TDM network interface 305, and memory 302. Each of these components communicates over a local interface 303, which can include one or more buses.

In addition, the IWF 105 comprises IWF logic 301. The IWF logic 301 can be implemented in software, hardware, firmware or any combination thereof. In the exemplary IWF 105 shown in FIG. 3, IWF logic 301 is implemented in software and stored in memory 302. Memory 302 may be of any type of memory known in the art, including, but not limited to random access memory (RAM), read-only memory (ROM), flash memory, and the like.

Processing unit 300 may be a digital processor or other type of circuitry configured to run the IWF logic 301 by processing and executing the instructions of the IWF logic 301. The processing unit 300 communicates to and drives the other elements within the IWF 103 via the local interface 303, which can include one or more buses.

In addition, the packet network interface 304 may be any type of communication device (e.g., Ethernet PHY) that communicatively couples the IWF 105 with the packet network 104 (FIG. 1), and the TDM network interface 305 may be any type of communication device that communicatively couples the IWF 103 with connection 106 to the TDM node 107 (FIG. 1).

During operation, the IWF logic 301 receives from the IWF 103, via the packet network interface 304, the Ethernet packet 115, which the IWF logic 301 stores in memory 302. The IWF logic 301 de-encapsulates the Ethernet packet 115 to obtain an IP packet. The IWF logic 301 then encapsulates the IP packet from the Ethernet packet 115 into the layer 2 protocol within TDM frame 114. The IWF logic 301 then transmits the TDM frame 114 to the TDM node 107 (FIG. 1).

During operation, the IWF logic 301 may receive a CCM 112 wherein an isDown indicator is asserted, for example, an AIS, LOS, or LOF may have been detected by the IWF 103 related to the TDM node 101 or the connection 102. Notably, the isDown indicator may also be asserted if there is a fault condition associated with the IWF 103 or any intermediate nodes in the Packet Network 104 (FIG. 1).

The IWF 105 interprets the isDown indicator in the CCM 112 as a fault, somewhere between TDM Node 101 and IWF 105 inclusive. Furthermore, if a CCM is not received at all from the IWF 103, such non-receipt of the CCM also indicates a fault.

If the IWF logic 301 interprets the CCM as indicating a fault condition or interprets the lack of CCM for a specified interval of time as indicating a fault condition, the IWF logic 301 generates an AIS and transmits the AIS to the TDM node 107.

Figure 4:
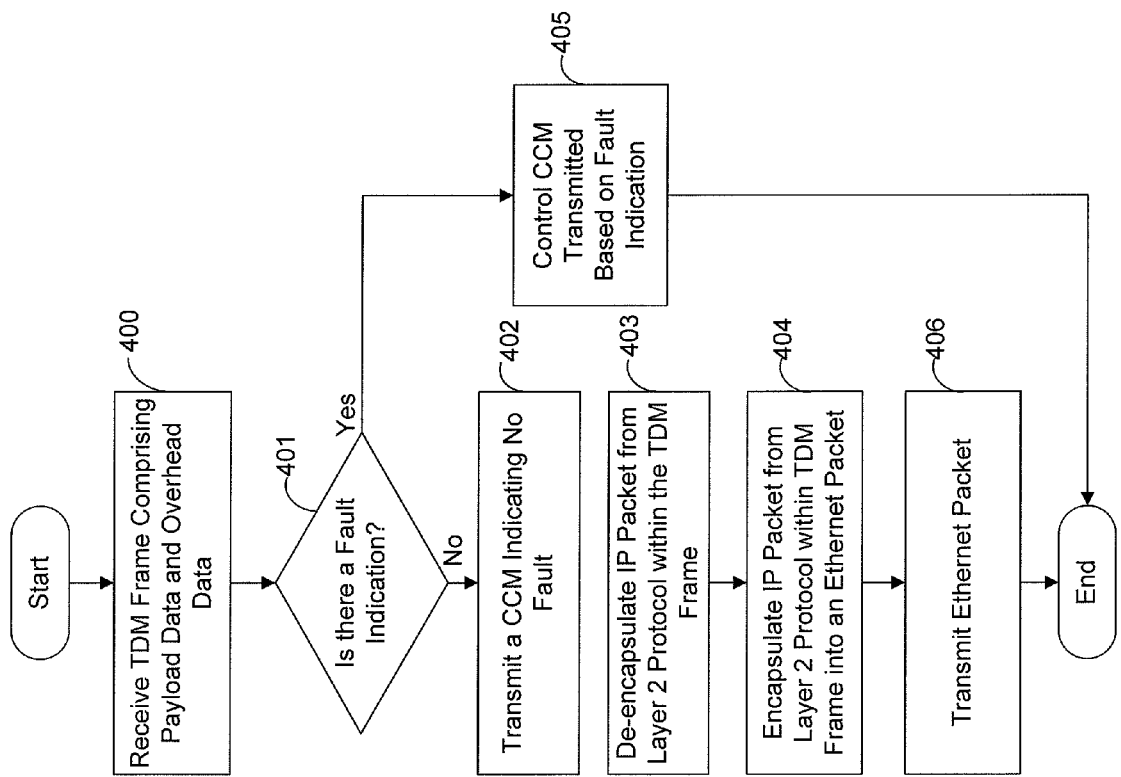
FIG. 4 is a flowchart depicting exemplary architecture and functionality of the IWF logic depicted in FIG. 2.

FIG. 4 depicts exemplary architecture and functionality of the interworking function logic 201. In step 400, the IWF logic 201 (FIG. 2) receives a TDM frame 108 (FIG. 1) that comprises TDM payload data and TDM overhead data. The TDM frame 108 is received from a TDM node 101 (FIG. 1).

In step 401, the IWF logic 201 determines if there is a fault indication. In this regard, the IWF 201 may receive an AIS from the TDM node 101. Alternatively, the IWF logic 201 may detect a LOS or a LOF in the TDM frame 108 received from the TDM node 101. In addition, there may be a fault in the layer 2 protocol such as the LCP, the NCP or the LMI.

If there is no fault indication, the IWF logic 201 transmits a CCM indicating an isUp indication in step 402. In addition, the IWF logic 201 de-encapsulates the TDM frame 108 to obtain the IP packet from the layer 2 payload in step 403. As described hereinabove, the TDM frame 108 comprises an IP packet over PPP over T1. The IWF logic 201 interworks the IP Packet into an Ethernet packet 115 (FIG. 1). In particular, in step 403, the IWF logic 201 de-encapsulates the IP Packet by stripping away the layer 2 overhead data to obtain the IP packet. The IWF logic 201 encapsulates the IP packet from the layer 2 protocol within the TDM frame into an Ethernet packet 115 (FIG. 1), as indicated in step 404. After encapsulation into the Ethernet packet 115, the IWF logic 201 transmits the Ethernet packet 115 to the IWF 105 (FIG. 1), in step 406.

If there is a fault indication in step 401, the IWF logic 201 controls the CCM 112 based upon the fault indication, as indicated in step 405. In this regard, the IWF logic 201 may transmit a CCM 112 having an isDown bit asserted. In addition, the IWF logic 201 may not transmit a CCM at all.

Figure 5:
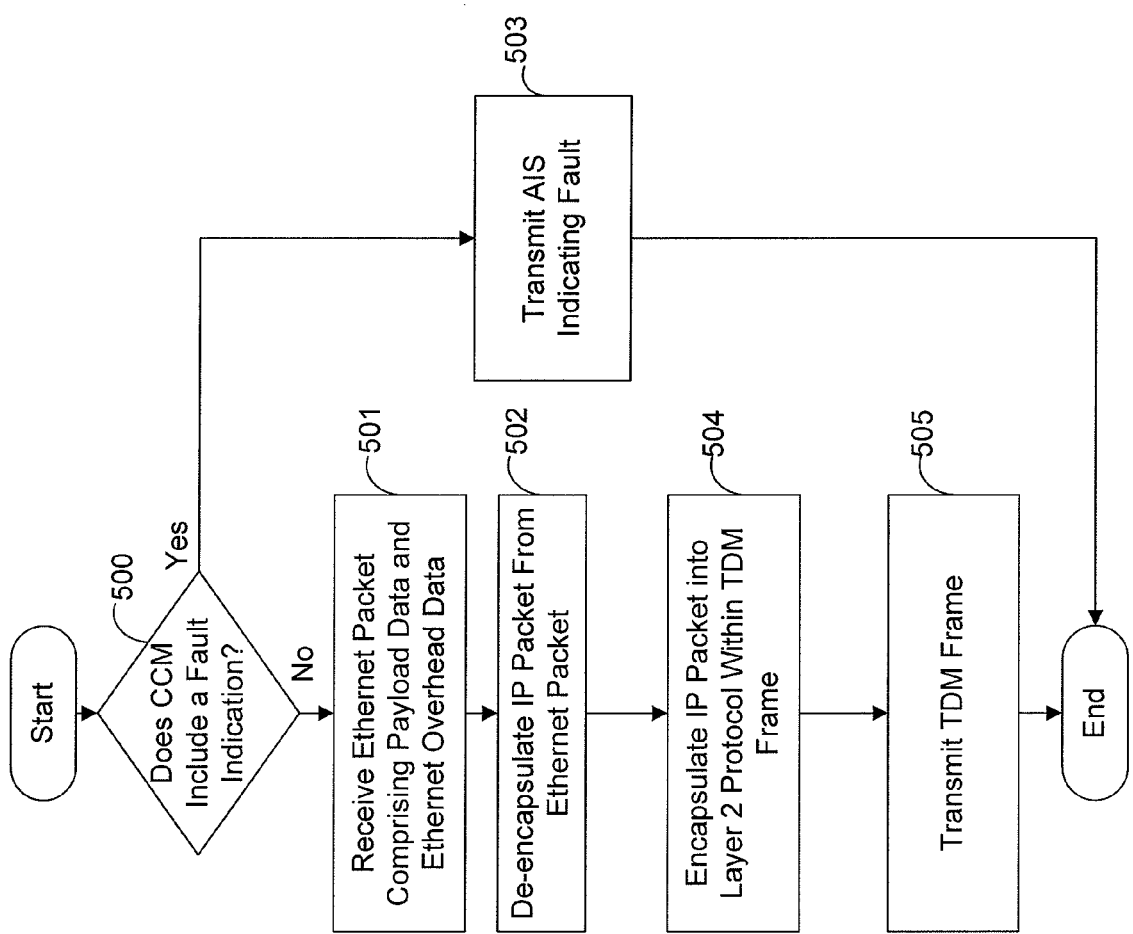
FIG. 5 is a flowchart depicting addition exemplary architecture and functionality of the IWF logic depicted in FIG. 2.

FIG. 5 depicts additional exemplary architecture and functionality of the interworking function logic 301 (FIG. 3). To continue with the example from FIG. 4, the IWF logic 301 interprets a received CCM 112 to determine if the TLV data indicates a fault condition. As described herein, in one embodiment, the fault indication is determined based upon the type length value (TLV) data 118 (FIG. 1). If the isDown indication is selected, then this indicates a fault condition. A fault indication can also be determined based upon the absence of received CCM 112 for a specified interval of time.

If the logic 301 interprets the CCM TLV or absence of CCM as indicating a fault condition in step 500, the IWF logic 301 conveys an AIS or some other TDM fault notification to the TDM node 107 (FIG. 1), as indicated in step 503. If the logic 301 does not interpret the CCM has indicating a TDM fault in step 500, then the IWF logic 301 receives the Ethernet packet 115 (FIG. 1) from the IWF 103 (FIG. 1). The Ethernet packet 115 contains payload data and overhead data. The payload data comprises the IP packet. Thus, in step 502, the IWF logic 301 de-encapsulates the IP Packet from Ethernet packet 115. That is, the IWF logic 301 strips away the Ethernet overhead to obtain the IP packet.

In step 504, the IWF logic 301 encapsulates the IP Packet within the layer 2 protocol of the TDM frame 114, which is stored in memory 302 (FIG. 3). As described hereinabove, the IWF logic 301 can build a TDM frame 114 having the same layer 2 protocol as that found in the TDM frame 108 (FIG. 1) that was transmitted from the TDM node 101 to the IWF 103.

Once the IWF logic 301 encapsulates the IP packet within the layer 2 protocol of the TDM frame 114, the IWF logic 301 transmits the TDM frame 114 to the TDM node 107 (FIG. 1).

The invention claimed is:

1. A communication system for propagating time division multiplexing (TDM) fault notifications, comprising:
    a first interworking function (IWF) node of a packet network, the first IWF node coupled to a first TDM node of a TDM network, the TDM network having a layer 2 protocol different than a layer 2 protocol of the packet network; and
    a second IWF node of the packet network, the second IWF node coupled to a second TDM node of the TDM network and configured to receive from the second TDM node TDM frames in accordance with the layer 2 protocol of the TDM network, the second IWF node configured to interwork payload of the TDM frames into data packets in accordance with the layer 2 protocol of the packet network for communication of the payload through the packet network via the data packets, the second IWF node further configured to detect a TDM fault of the TDM network based on a TDM frame received by the second IWF node from the second TDM node and to transmit continuity check messages (CCMs) in accordance with the layer 2 protocol of the packet network to the first IWF node, wherein the second IWF node is configured to control the CCMs in response to a detection of the TDM fault such that a TDM fault notification is propagated from the second IWF node to the first IWF node based on the CCMs, and wherein the first IWF node is configured to transmit to the first TDM node a TDM frame in accordance with the layer 2 protocol of the TDM network and indicative of the TDM fault notification.

2. The system of claim 1, wherein the second IWF node is configured to manipulate a type length value (TLV) field of one of the CCMs in response to the detection of the TDM fault, and wherein the first IWF node is configured to interpret the TLV field as indicating a TDM fault.

3. The system of claim 1, wherein the second IWF node is configured to stop transmitting the CCMs to the first IWF node for at least a specified period in response to the detection of the TDM fault, and wherein the first IWF node is configured to detect the TDM fault notification from the second IWF node based on one of the CCMs by determining that the first IWF node has not received a CCM from the second IWF for at least a specified period after receiving the one CCM.

4. The system of claim 1, wherein the packet network comprises an Ethernet network, and wherein each of the CCMs is an Ethernet CCM.

5. The system of claim 1, wherein the detection of the TDM fault is based on an alarm indication signal (AIS) transmitted from the first TDM node.

6. The system of claim 1, wherein the detection of the TDM fault is based on a loss of signal (LOS).

7. The system of claim 1, wherein the detection of the TDM fault is based on a loss of frame (LOF).

8. The system of claim 1, wherein the second IWF node is configured to receive from the first TDM node a first TDM frame in accordance with the layer 2 protocol of the TDM network and to de-encapsulate the first TDM frame to recover an internet protocol (IP) packet.

9. The system of claim 8, wherein the second IWF node is configured to encapsulate the IP packet within an Ethernet packet and transmit the Ethernet packet to the first IWF node, and wherein the first IWF node is configured to de-encapsulate the Ethernet packet to obtain the IP packet and to encapsulate the IP packet into a second TDM frame in accordance with the layer 2 protocol of the TDM network and transmit the second TDM frame to the second TDM node.

10. A communication method for propagating time division multiplexing (TDM) fault notifications through a packet network embedded within a TDM network, wherein the TDM network has a layer 2 protocol different than a layer 2 protocol of the packet network, the method comprising:
    receiving, at a first interworking function (IWF) node of the packet network from a first TDM node of the TDM network, TDM frames in accordance with the layer 2 protocol of the TDM network;
    interworking, via the first IWF node, payload of the TDM frames into data packets in accordance with the layer 2 protocol of the packet network;
    transmitting the data packets through the packet network;
    detecting a TDM fault at the first IWF node based on the TDM frames, the first IWF node located on an edge of the packet network, wherein the CCMs are in accordance with the layer 2 protocol of the packet network;
    controlling transmission of continuity check messages (CCMs) to a second IWF node based upon the detecting, the second IWF node located at an edge of the packet network;
    detecting the TDM fault at the second IWF node based on the CCMs; and
    transmitting from the second IWF node to a second TDM node of the TDM network a TDM frame in accordance with the layer 2 protocol of the TDM network and indicative of the TDM fault.

11. The method of claim 10, further comprising manipulating a type length value (TLV) field of one of the CCMs in response to the detecting.

12. The method of claim 11, further comprising interpreting the TLV field of the one CCM at the second IWF node as indicating the TDM fault.

13. The method of claim 10, further comprising stopping transmission of the CCMs for at least a specified period in response to the TDM fault.

14. The method of claim 13, wherein the detecting the TDM fault at the second IWF node further comprises detecting the TDM fault in response to a determination that a CCM has not been received for at least the specified time period.

15. An interworking function for providing an interface between a time division multiplexing (TDM) network and a packet network embedded within the TDM network, the TDM network having a layer 2 protocol different than a layer 2 protocol of the packet network, the interworking function comprising:
    a packet network interface configured to receive data packets and continuity check messages (CCMs) from the packet network, the data packets and the CCMs in accordance with the layer 2 protocol of the packet network;
    a TDM network interface coupled to a communication connection that is coupled to a TDM node of the TDM network; and
    logic configured to de-encapsulate internet protocol (IP) packets from the data packets and to encapsulate the IP packets into the layer 2 protocol of the TDM network within TDM frames to be transmitted to the TDM node via the TDM network interface, the logic further configured to detect a TDM fault of the TDM network based on at least one of the CCMs or absence of said CCMs and to transmit a TDM fault notification to the TDM node via the TDM network interface in response to a detection of the TDM fault, wherein the TDM fault notification is in accordance with the layer 2 protocol of the TDM network.

16. The interworking function of claim 15, wherein the one CCM has a type length value (TLV) field in accordance with Ethernet OAM protocol, and wherein the logic is configured to interpret the TLV field as indicating the TDM fault.

17. The interworking function of claim 15, wherein the logic is configured to detect the TDM fault in response to a determination that at least a specified amount of time has elapsed without the interworking function receiving a CCM from a source of the received CCMs.

18. The interworking function of claim 15, wherein the packet network comprises an Ethernet network, and wherein each of the CCMs is an Ethernet CCM.

19. The method of claim 10, wherein the packet network comprises an Ethernet network, and wherein each of the CCMs is an Ethernet CCM.

* * * * *